US011861847B2

United States Patent
Kurihara et al.

(10) Patent No.: US 11,861,847 B2
(45) Date of Patent: Jan. 2, 2024

(54) IMAGE PROCESSING DEVICE, THERMAL IMAGE GENERATION SYSTEM, AND RECORDING MEDIUM

(71) Applicant: Mitsubishi Electric Corporation, Tokyo (JP)

(72) Inventors: Kohei Kurihara, Tokyo (JP); Koichi Yamashita, Tokyo (JP); Daisuke Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 344 days.

(21) Appl. No.: 17/435,396

(22) PCT Filed: Mar. 11, 2019

(86) PCT No.: PCT/JP2019/009680
§ 371 (c)(1),
(2) Date: Sep. 1, 2021

(87) PCT Pub. No.: WO2020/183565
PCT Pub. Date: Sep. 17, 2020

(65) Prior Publication Data
US 2022/0148192 A1   May 12, 2022

(51) Int. Cl.
*G06T 7/194* (2017.01)
*G06T 7/55* (2017.01)
(Continued)

(52) U.S. Cl.
CPC .............. *G06T 7/194* (2017.01); *G06T 5/003* (2013.01); *G06T 7/536* (2017.01); *G06T 7/55* (2017.01); *G06T 2207/10024* (2013.01)

(58) Field of Classification Search
CPC .......... G06T 5/003; G06T 5/50; G06T 7/194; G06T 7/536; G06T 7/55;
(Continued)

(56) References Cited

U.S. PATENT DOCUMENTS

2016/0292826 A1* 10/2016 Beall .................... G06T 7/80
2018/0300884 A1* 10/2018 Schulte .................. G06T 5/50
2020/0029016 A1    1/2020 Tanaka et al.

FOREIGN PATENT DOCUMENTS

JP    2004-320077 A    11/2004
JP    2011-135409 A    7/2011
JP    2018-129672 A    8/2018

OTHER PUBLICATIONS

Jeon et al., "Human Detection Based on the Generation of a Background Image by Using a Far-Infrared Light Camera", Sensors 2015, 15, pp. 6763-6788 (Year: 2015).*
(Continued)

*Primary Examiner* — Nay A Maung
*Assistant Examiner* — Jose M Torres
(74) *Attorney, Agent, or Firm* — XSENSUS LLP

(57) ABSTRACT

A background image generator (21) stores, in a storage device (3), a skeleton image obtained by calculating a feature quantity for each of multiple first thermal images (Din1) obtained by imaging by a thermal image sensor (1) in the same field of view or multiple sorted images (Dc) generated from the first thermal images, generating an average image from the first thermal images or sorted images, sharpening the average image, and then extracting a skeleton component. An image corrector (22) corrects, by using the skeleton image stored in the storage device (3), a second thermal image (Din2) obtained by imaging by the thermal image sensor in the same field of view as the first thermal images, thereby generating a corrected thermal image. It is possible to generate a sharp thermal image with a high S/N ratio.

19 Claims, 9 Drawing Sheets

(51) Int. Cl.
*G06T 7/536* (2017.01)
*G06T 5/00* (2006.01)

(58) Field of Classification Search
CPC . G06T 2207/10024; G06T 2207/10048; G06T 2207/20216; H04N 7/18; H04N 23/20; H04N 23/60; H04N 23/80
See application file for complete search history.

(56) References Cited

OTHER PUBLICATIONS

International Search Report and Written Opinion dated May 28, 2019, received for PCT Application PCT/JP2019/009680, Filed on Mar. 11, 2019, 7 pages including English Translation.

* cited by examiner

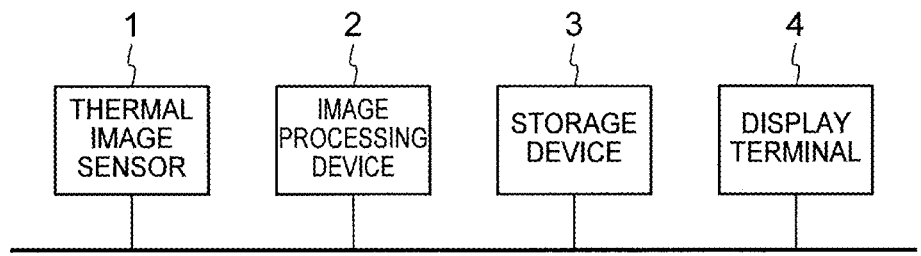
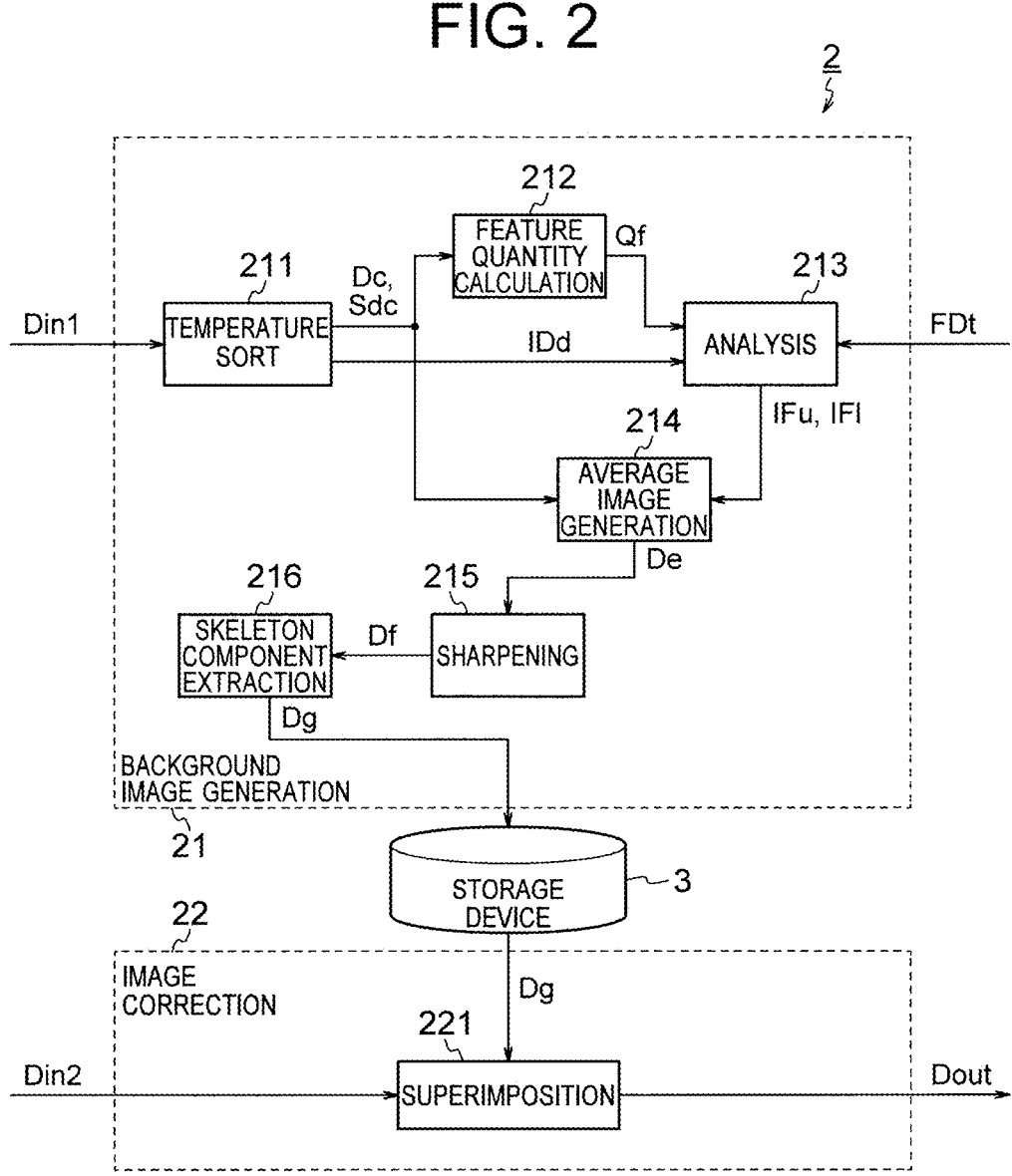

IMAGE PROCESSING DEVICE, THERMAL IMAGE GENERATION SYSTEM, AND RECORDING MEDIUM

CROSS-REFERENCE TO RELATED APPLICATION

The present application is based on PCT filing PCT/JP2019/009680, filed Mar. 11, 2019, the entire contents of which are incorporated herein by reference.

TECHNICAL FIELD

The present invention relates to an image processing device and a thermal image generation system. The present invention also relates to a program and a recording medium.

BACKGROUND ART

A typical thermal-type infrared solid-state imaging device (referred to below as a thermal image sensor) images infrared light emitted by objects; infrared light emitted by objects is concentrated by a lens to form an image on an imaging element, and differences between temperature rises caused by absorption of the infrared light by the imaging element provide image density differences.

Thermal image sensors capable of obtaining thermal information can obtain information that cannot be obtained by visible cameras. However, inexpensive small thermal image sensors are poor in image resolution, contrast, outline sharpness, and S/N ratio. On the other hand, large thermal image sensors are expensive. It is desired to use an inexpensive thermal image sensor and improve the image quality by image processing.

There is proposed a method of sharpening a thermal image (an image obtained by imaging using infrared light) (see, e.g., Patent Literature 1).

CITATION LIST

Patent Literature

Patent Literature 1: Japanese Patent Application Publication No. 2018-129672 (page 4)

SUMMARY OF INVENTION

Technical Problem

The method of Patent Literature 1 has a problem in that in the case of an inexpensive small thermal image sensor, due to poor S/N ratio, sharpening amplifies noise and reduce visibility.

The present invention has been made to solve the problem as described above, and is intended to make it possible to generate a sharp thermal image with a high S/N ratio.

Solution to Problem

An image processing device of one aspect of the present invention includes:
a background image generator; and
an image corrector,
wherein the background image generator
determines a middle image located at a middle when first thermal images of multiple frames obtained by imaging by a thermal image sensor in a same field of view or sorted images of multiple frames generated from the first thermal images are ranked in order of brightness,
calculates a feature quantity serving as an indicator of brightness for each of the first thermal images or the sorted images,
generates an average image by averaging, in a frame direction, first thermal images or sorted images of multiple frames of the first thermal images or the sorted images satisfying a condition that a difference in the feature quantity between the first thermal image or the sorted image and the middle image is smaller than a predetermined difference threshold, and
stores, in a storage device, a skeleton image obtained by sharpening the average image and then extracting a skeleton component, and
wherein the image corrector generates a corrected thermal image by correcting a second thermal image obtained by imaging by the thermal image sensor in a same field of view as the first thermal images, by using the skeleton image stored in the storage device.

An image processing device of another aspect of the present invention includes:
a background image generator; and
an image corrector,
wherein the background image generator
determines a middle image located at a middle when first thermal images of multiple frames obtained by imaging by a thermal image sensor in a same field of view or sorted images of multiple frames generated from the first thermal images are ranked in order of brightness,
calculates a feature quantity serving as an indicator of brightness for each of the first thermal images or the sorted images,
generates an average image by averaging, in a frame direction, first thermal images or sorted images of multiple frames of the first thermal images or the sorted images satisfying a condition that a difference in the feature quantity between the first thermal image or the sorted image and the middle image is smaller than a predetermined difference threshold, and
stores, in a storage device, a sharpened image obtained by sharpening the average image, and
wherein the image corrector generates a corrected thermal image by correcting a second thermal image obtained by imaging by the thermal image sensor in a same field of view as the first thermal images, by using a skeleton image obtained by extracting a skeleton component from the sharpened image stored in the storage device.

Advantageous Effects of Invention

With the present invention, it is possible to generate a sharp thermal image with a high S/N ratio.

BRIEF DESCRIPTION OF DRAWINGS

FIG. 1 is a diagram illustrating a general configuration of a thermal image generation system including an image processing device of a first embodiment of the present invention.

FIG. 2 is a functional block diagram of the image processing device of the first embodiment of the present invention.

DESCRIPTION OF EMBODIMENTS

First Embodiment

Figure 3A:
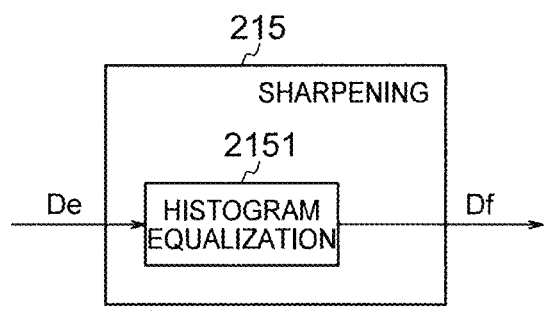
FIGS. 3A and 3B are diagrams illustrating different configuration examples of a sharpening unit of FIG. 2.

Embodiments of the present invention will be described below with reference to the drawings.

FIG. 1 illustrates a general configuration of a thermal image generation system including an image processing device of a first embodiment of the present invention.

The infrared generation system illustrated in FIG. 1 includes a thermal image sensor 1, an image processing device 2, a storage device 3, and a display terminal 4.

The thermal image sensor 1 detects infrared light emitted from an object, and generates a thermal image representing a temperature distribution of the object. The infrared light mentioned here is electromagnetic waves having wavelengths of, for example, 8 to 12 μm. The thermal image sensor 1 includes multiple infrared detection elements arranged one-dimensionally or two-dimensionally. A signal output from each infrared detection element indicates a value (pixel value) of a pixel of the thermal image.

As the infrared detection elements, for example, pyroelectric elements may be used. Alternatively, it is possible to use thermopile-type infrared detection elements obtained by connecting thermocouples exhibiting the Seebeck effect, bolometer-type infrared detection elements that use change in resistance with increase in temperature, or the like.

The infrared detection elements are not limited to these, and may be of any type as long as they can detect infrared light.

FIG. 2 is a functional block diagram of the image processing device 2 of the first embodiment.

The illustrated image processing device 2 includes a background image generator 21 and an image corrector 22.

The background image generator 21 generates a background image on the basis of thermal images, which are multiple frames, output from the thermal image sensor 1.

The thermal images, which are multiple frames, used for generation of the background image are obtained by the thermal image sensor 1 repeating imaging in the same field of view.

The background image generator 21 ranks pixels at the same positions of the thermal images, which are multiple frames, in order of magnitude of the pixel values, and generates sorted images, which are multiple frames, each formed by a set of pixels having the same rank.

The background image generator 21 further determines, as a middle image, a sorted image formed by a set of the pixels located at a middle, i.e., the pixels having a middle rank, when the pixels are ranked in order of magnitude of the pixel values.

The middle image determined in this manner is formed by a set of the pixels having the middle rank, and thus is a sorted image located at a middle when the sorted images Dc, which are multiple frames, are ranked in order of brightness.

The background image generator 21 further calculates a feature quantity for each of the sorted images, which are multiple frames, and generates an average image by averaging, in a frame direction, sorted images satisfying the condition that the difference in the feature quantity between the sorted image and the middle image is smaller than a predetermined threshold (difference threshold) FDt.

After sharpening the average image, the background image generator 21 generates a skeleton (or outline) image Dg by extracting a skeleton (or outline) component, and stores the generated skeleton image Dg as the background image in the storage device 3.

Each of the thermal images, which are multiple frames, used in the generation of the background image will be referred to as a first thermal image, and denoted by reference character Din1.

The image corrector 22 superimposes the skeleton image Dg stored in the storage device 3 on a second thermal image Din2 that is obtained by imaging in the same field of view as the first thermal images Din1 and output from the thermal image sensor 1, thereby generating a corrected thermal image Dout. The corrected thermal image Dout is sharpened and improved in S/N ratio relative to the second thermal image Din2.

The background image generator 21 includes a temperature sorter 211, a feature quantity calculator 212, an analyzer 213, an average image generator 214, a sharpening unit 215, and a skeleton component extractor 216.

The temperature sorter 211 compares the pixels at the same positions of the first thermal images Din1, which are multiple frames, e.g., N frames (N being an integer of 2 or more), and ranks the pixels in order of magnitude of the pixel values. In ranking them, it is possible to rank them from the highest to the lowest (in descending order) or from the lowest to the highest (in ascending order) of the pixel values.

The temperature sorter 211 further generates the sorted images Dc, which are multiple frames, each formed by a set of the pixels having the same rank.

Thus, the n-th sorted image Dc is formed by a set of the pixels whose rank is n (n being one of 1 to N).

The temperature sorter 211 further determines, as the middle image Dd, a sorted image Dc formed by a set of the pixels located at the middle, i.e., the pixels having the middle rank, when the pixels are ranked in order of magnitude of the pixel values.

The temperature sorter 211 outputs the generated multiple sorted images Dc together with information Sdc indicating the respective ranks.

The temperature sorter 211 further outputs information IDd identifying the middle image Dd.

The feature quantity calculator 212 calculates a feature quantity Qf serving as an indicator of brightness, for each of the sorted images Dc, which are multiple frames. As the feature quantity Qf, an average (or mean) value, a middle (or intermediate or median) value, a highest value, or a lowest value of pixel values of each sorted image, which is each frame, is calculated.

The analyzer 213 receives the feature quantity Qf of each sorted image from the feature quantity calculator 212, receives the information IDd identifying the middle image Dd from the temperature sorter 211, and determines a high-temperature boundary frame Fu and a low-temperature boundary frame Fl.

The analyzer 213 determines, as the high-temperature boundary frame Fu, an image having the largest feature quantity of the sorted images satisfying the condition that the feature quantity of the sorted image is larger than that of the middle image Dd and the difference (absolute value) in the feature quantity between the sorted image and the middle image Dd is smaller than the difference threshold FDt.

When there is no sorted image satisfying the condition that the feature quantity of the sorted image is larger than that of the middle image Dd and the difference (absolute value) in the feature quantity is not smaller than the difference threshold FDt, an image having the largest feature quantity of the sorted images is determined as the high-temperature boundary frame Fu.

The analyzer 213 further determines, as the low-temperature boundary frame Fl, an image having the smallest feature quantity of the sorted images satisfying the condition that the feature quantity of the sorted image is smaller than that of the middle image Dd and the difference (absolute value) in the feature quantity between the sorted image and the middle image Dd is smaller than the difference threshold FDt.

When there is no sorted image satisfying the condition that the feature quantity of the sorted image is smaller than that of the middle image Dd and the difference (absolute value) in the feature quantity is not smaller than the difference threshold FDt, an image having the smallest feature quantity of the sorted images is determined as the low-temperature boundary frame Fl.

The analyzer 213 outputs information IFu identifying the high-temperature boundary frame Fu and information IFl identifying the low-temperature boundary frame Fl.

The difference threshold FDt may be stored in the storage device 3 or a parameter memory (not illustrated).

The average image generator 214 receives, from the temperature sorter 211, the sorted images Dc and the information Sdc indicating the ranks of the respective sorted images, receives, from the analyzer 213, the information IFu identifying the high-temperature boundary frame Fu and the information IFl identifying the low-temperature boundary frame Fl, and generates the average image De.

The average image generator 214 generates the average image De by averaging, in the frame direction, the pixel values of the images, which are frames, from the high-temperature boundary frame Fu to the low-temperature boundary frame Fl (including the high-temperature boundary frame Fu and low-temperature boundary frame Fl) of the sorted images Dc, which are multiple frames. "Averaging in the frame direction" refers to averaging the pixel values of the pixels at the same positions of images, which are multiple frames.

In generating the average image De, by excluding the frames having feature quantities larger than the feature quantity of the high-temperature boundary frame Fu and the frames having feature quantities smaller than the feature quantity of the low-temperature boundary frame Fl, it is possible to prevent the average image from being affected by objects, in particular heat sources (high-temperature objects) or low-temperature objects, that appear temporarily. The objects that appear temporarily mentioned here include persons.

The sharpening unit 215 sharpens the average image De to generate a sharpened image Df.

Examples of the method of sharpening in the sharpening unit 215 include histogram equalization and a retinex method.

FIG. 3A illustrates a configuration example of the sharpening unit 215 that performs the sharpening by histogram equalization. The sharpening unit 215 illustrated in FIG. 3A is formed by a histogram equalizer 2151.

The histogram equalizer 2151 performs histogram equalization on the average image De. Histogram equalization is a process of calculating a pixel value distribution of the entire image and changing the pixel values so that the pixel value distribution has a desired shape.

The histogram equalization may be contrast limited adaptive histogram equalization.

Figure 3B:
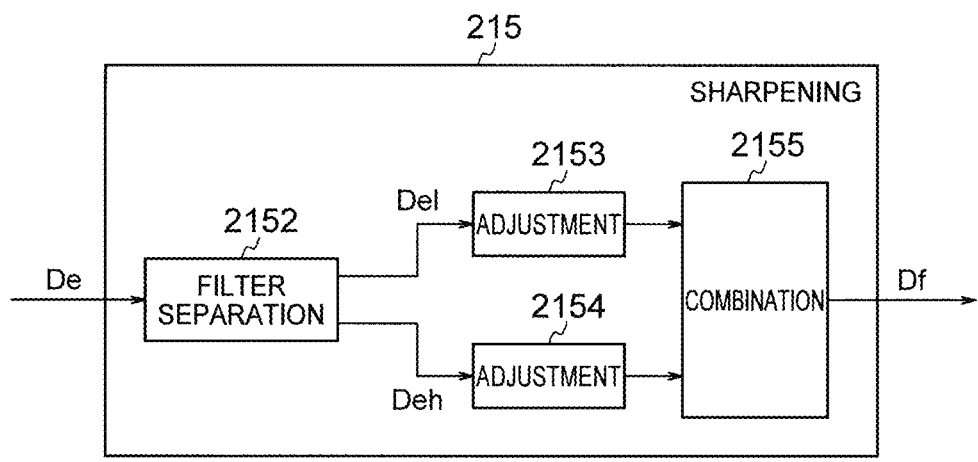

FIG. 3B illustrates a configuration example of the sharpening unit 215 that performs the sharpening by a retinex method.

The sharpening unit 215 illustrated in FIG. 3B includes a filter separator 2152, adjusters 2153 and 2154, and a combiner 2155.

The filter separator 2152 separates the input average image De into a low-frequency component Del and a high-frequency component Deh.

The adjuster 2153 multiplies the low-frequency component Del by a first gain to adjust the magnitudes of the pixel values.

The adjuster 2154 multiplies the high-frequency component Deh by a second gain to adjust the magnitudes of the pixel values. The second gain is larger than the first gain.

The combiner 2155 combines the outputs of the adjusters 2153 and 2154. The image resulting from the combination has an enhanced high-frequency component.

The skeleton component extractor 216 extracts a skeleton component from the sharpened image Df output from the sharpening unit 215, and generates the skeleton image Dg formed by the extracted skeleton component.

The skeleton component is a component representing a general structure of the image, and includes an edge component and a flat component (a slowly varying component) in the image. For the extraction of the skeleton component, a total variation norm minimization method can be used, for example.

The background image generator 21 transmits and stores the skeleton image Dg as the background image to and in the storage device 3.

The image corrector 22 corrects the second thermal image Din2 output from the thermal image sensor 1 by using the skeleton image Dg stored in the storage device 3, and generates and outputs the corrected thermal image Dout.

As described above, the second thermal image Din2 is obtained by imaging in the same field of view as the first thermal images Din1. The second thermal image Din2 may be obtained by imaging at an imaging time different from those of the first thermal images Din1, or one, which is one frame, of the first thermal images Din1 may be used as the second thermal image.

In the example of FIG. 2, the image corrector 22 includes a superimposer 221.

The superimposer 221 generates the corrected thermal image Dout by superimposing the skeleton image Dg on the second thermal image Din2. The superimposition is performed by, for example, weighted addition.

To make the component of the skeleton image Dg sharper, it is possible to multiply the skeleton image Dg by a gain when adding the skeleton image Dg.

Such weighted addition is represented by the following Equation (1):

$$P_{Dout}=P_{Din2}+P_{Dg} \times g. \quad \text{Equation (1)}$$

In Equation (1), $P_{Din2}$ is a pixel value of the second thermal image Din2, $P_{Dg}$ is a pixel value of the skeleton image Dg, g is a gain for the skeleton image Dg, and $P_{Dout}$ is a pixel value of the corrected thermal image Dout.

The above is a description of an operation of the image processing device according to the first embodiment.

The image processing device of the first embodiment generates the skeleton image with less noise and high contrast from the first thermal images, which are multiple frames, stores it as the background image, and combines the stored skeleton image with the second thermal image. Thus, the image processing device can generate a thermal image with a high S/N ratio and a high temporal resolution.

Also, instead of simply using the average image as the background image, by extracting only the skeleton component of the average image, storing it as the background image, and adding it to the second thermal image, it is possible to add background structure information while preserving temperature information of the second thermal image.

Also, in generating the background image, by excluding the thermal images, which are frames, satisfying the condition that the difference in the feature quantity between the thermal image and the middle image Dd is not smaller than the difference threshold FDt, it is possible to prevent the background image from being affected by objects, in particular heat sources (high-temperature objects) or low-temperature objects, that appear temporarily.

Second Embodiment

Figure 4:
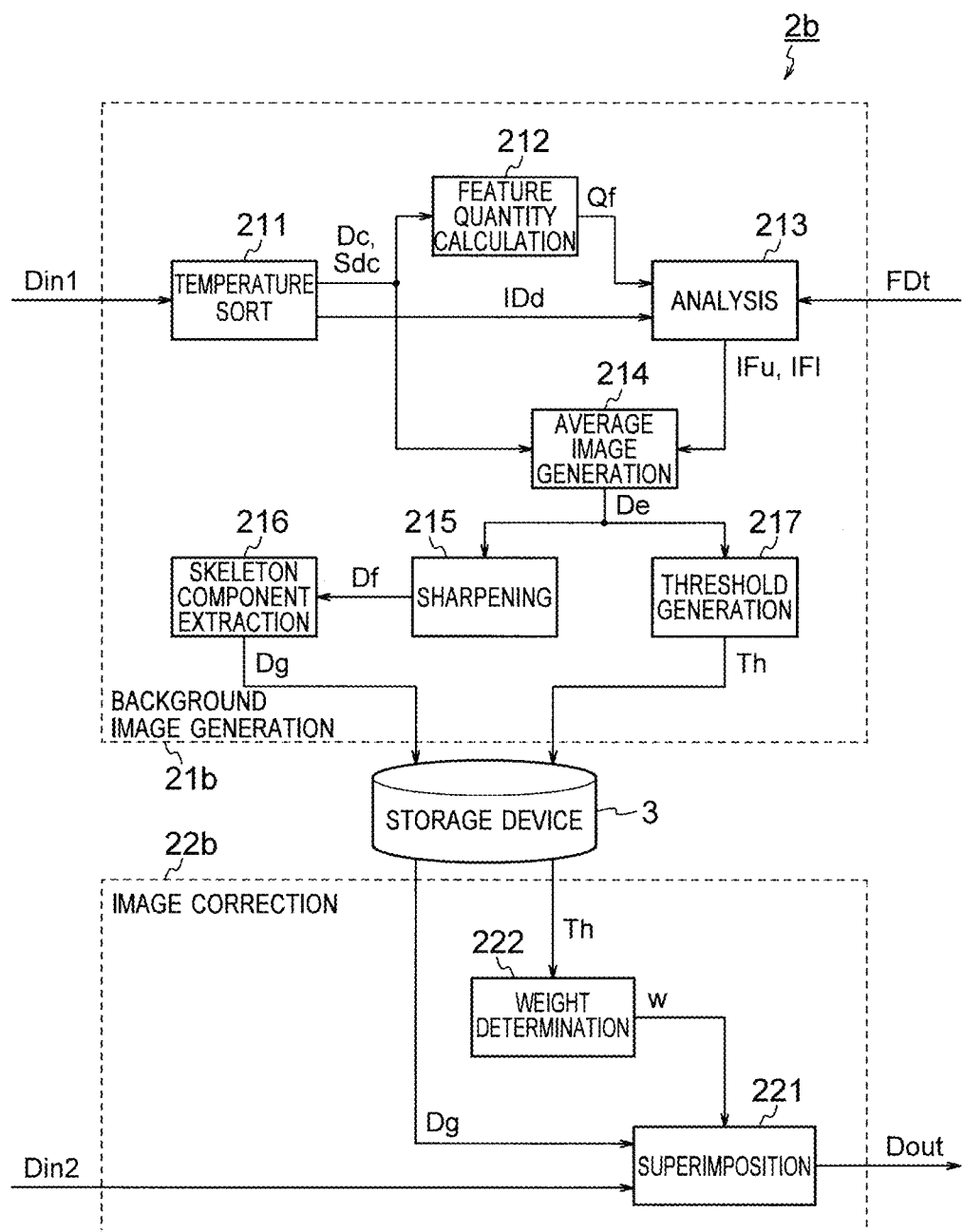
FIG. 4 is a functional block diagram of an image processing device of a second embodiment of the present invention.

FIG. 4 is a functional block diagram of an image processing device 2b of a second embodiment of the present invention.

The image processing device 2b illustrated in FIG. 4 is generally the same as the image processing device 2 of FIG. 2, but includes a background image generator 21b and an image corrector 22b instead of the background image generator 21 and image corrector 22.

The background image generator 21b is generally the same as the background image generator 21, but includes a threshold generator 217.

The image corrector 22b is generally the same as the image corrector 22, but includes a weight determiner 222.

The threshold generator 217 generates a threshold Th for weight determination, and transmits and stores the threshold Th to and in the storage device 3. For example, the threshold generator 217 obtains an average (or mean) value or a middle (or intermediate or median) value of pixel values of the average image De output from the average image generator 214, and determines the threshold Th on the basis of the calculated average value or middle value. The average value or middle value of pixel values of the average image De refers to an average value or middle value of the pixel values of the pixels of the entire average image De or the pixel values of the pixels located in a main portion of the average image De.

The relationship of the threshold Th with the above average value or middle value is determined on the basis of experience or experiment (simulation).

The threshold Th may be set to a value higher than the above average value or middle value. In this case, a value obtained by adding the difference threshold FDt to the above average value or middle value may be determined as the threshold Th. In such a case, the difference threshold FDt is also provided to the threshold generator 217.

The threshold generator 217 transmits and stores the generated threshold Th to and in the storage device 3.

The weight determiner 222 creates a weight table on the basis of the threshold Th stored in the storage device 3, and generates a combination weight w on the basis of a pixel value of the second thermal image Din2 with reference to the created weight table.

Figure 5A:
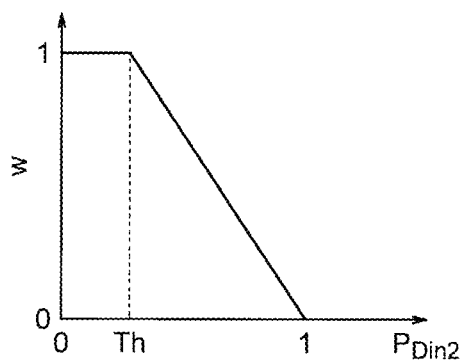
FIGS. 5A to 5D are diagrams illustrating different examples of a weight table used in the image processing device of FIG. 4.
Figure 5B:
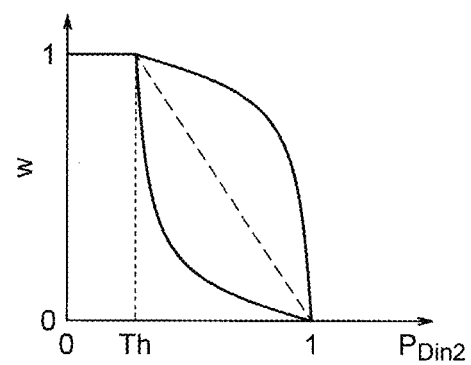

FIGS. 5A and 5B illustrate examples of the weight table created by the weight determiner 222 on the basis of the threshold Th.

In the examples illustrated in FIGS. 5A and 5B, in the range in which the pixel value $P_{Din2}$ of the second thermal image Din2 is from 0 to the threshold Th, the combination weight w is kept at 1, and in the range in which the pixel value $P_{Din2}$ is larger than the threshold Th, the combination weight w gradually decreases as the pixel value $P_{Din2}$ increases.

By using the weight table illustrated in FIG. 5A or 5B, it is possible to reduce a rate of the weighted addition of the skeleton image Dg only when the pixel value of the second thermal image Din2 is higher than the threshold Th.

Figure 5C:
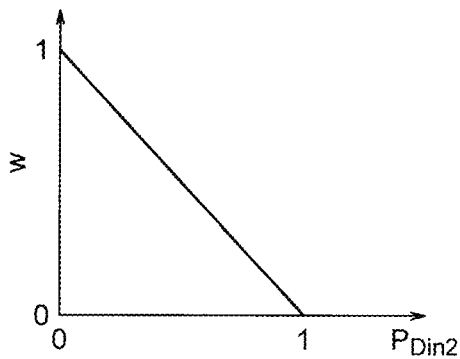
Figure 5D:
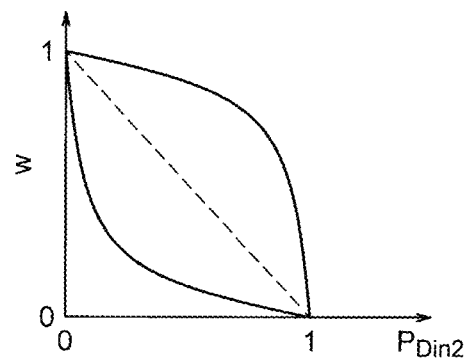

In the above example, the weight determiner 222 creates the weight table by using the threshold Th. However, the weight table may be created without using the threshold Th. FIGS. 5C and 5D illustrate examples of the weight table created without using the threshold Th.

In the examples illustrated in FIGS. 5C and 5D, when the pixel value $P_{Din2}$ of the second thermal image Din2 is 0, the combination weight w is 1, and the combination weight w gradually decreases as the pixel value $P_{Din2}$ increases. Even with such a weight table, it is possible to reduce the addition rate of the skeleton image Dg in a range in which the pixel value $P_{Din2}$ is large.

In short, the weight table should be such that the combination weight w decreases as the pixel value of the second thermal image Din2 increases.

When the weight table illustrated in FIG. 5C or 5D is created, the background image generator 21b need not include the threshold generator 217 (and thus may be the same as the background image generator 21 of FIG. 2), and the weight determiner 222 need not read the threshold Th from the storage device 3.

Third Embodiment

Figure 6:
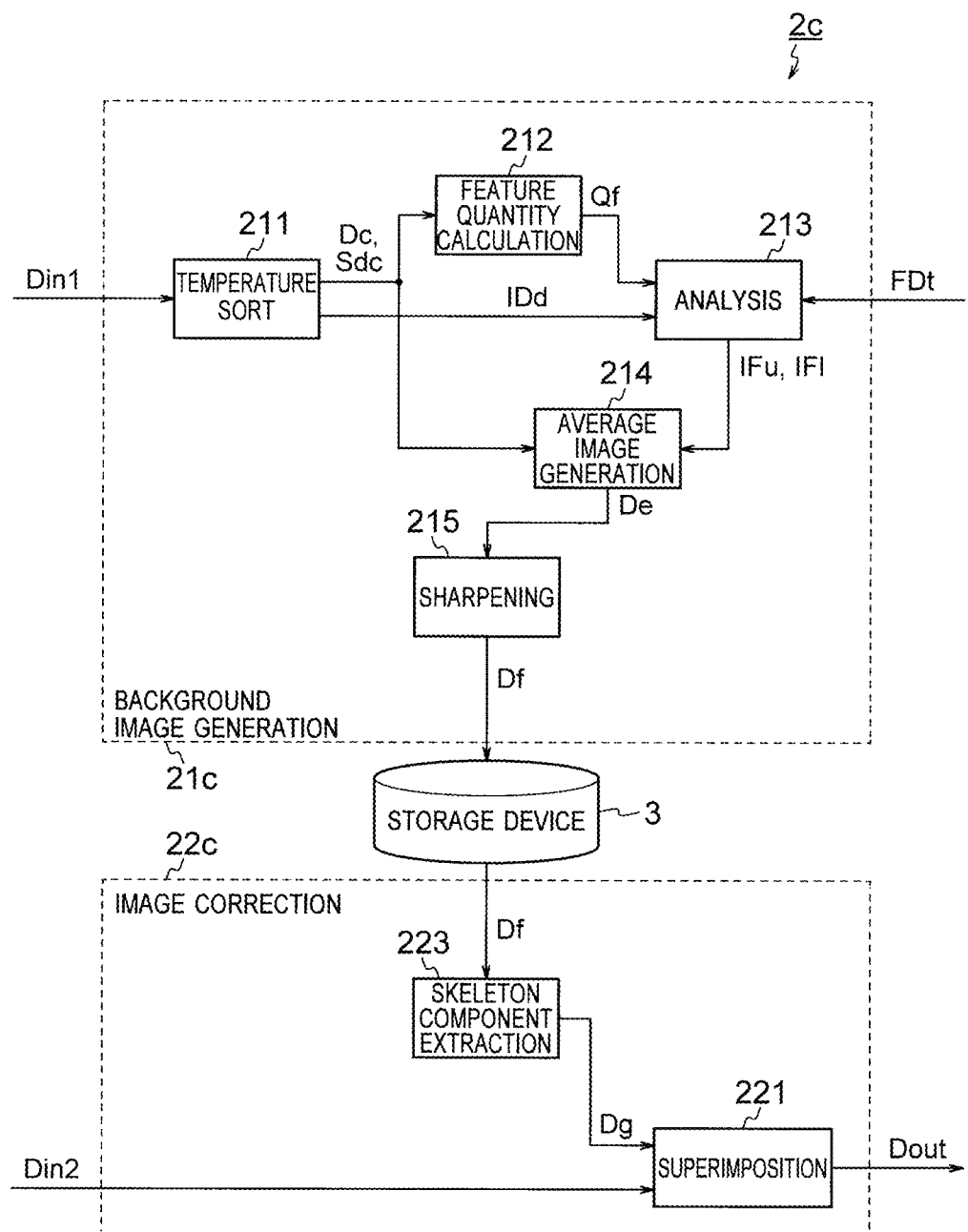
FIG. 6 is a functional block diagram of an image processing device of a third embodiment of the present invention.

FIG. 6 is a functional block diagram of an image processing device 2c of a third embodiment of the present invention.

The image processing device 2c illustrated in FIG. 6 is generally the same as the image processing device 2 of FIG. 2, but includes a background image generator 21c and an image corrector 22c instead of the background image generator 21 and image corrector 22.

The background image generator 21c is generally the same as the background image generator 21 of FIG. 2, but does not include the skeleton component extractor 216 of FIG. 2 and stores the sharpened image Df output from the sharpening unit 215 as the background image in the storage device 3.

The image corrector 22c reads the sharpened image Df stored in the storage device 3, extracts a skeleton component to generate a skeleton image Dg, and corrects a second thermal image Din2 by using the skeleton image Dg.

Thus, in the image processing device 2c illustrated in FIG. 6, the extraction of the skeleton component is performed in the image corrector, not in the background image generator.

Specifically, the image corrector 22c includes a skeleton component extractor 223 and a superimposer 221.

The skeleton component extractor 223 reads the sharpened image Df stored in the storage device 3, and extracts the skeleton component to generate the skeleton image Dg.

The superimposer 221 corrects the second thermal image Din2 by superimposing the skeleton image Dg on the second thermal image Din2, and generates a corrected thermal image Dout.

In the case of the configuration illustrated in FIG. 6, by reading the sharpened image Df from the storage device 3 and displaying it, it is possible to easily determine whether the sharpened image Df includes a heat source.

Fourth Embodiment

Figure 7:
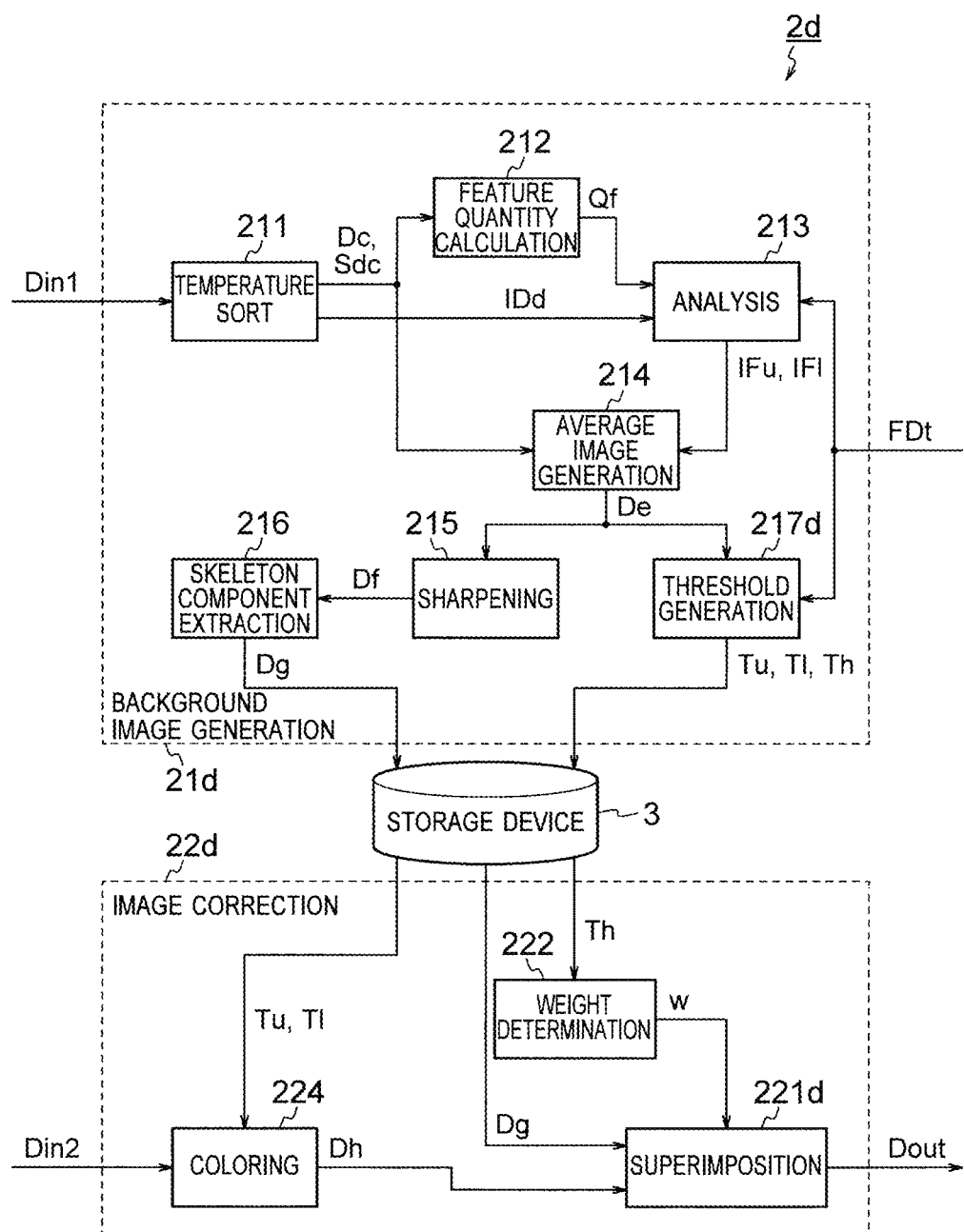
FIG. 7 is a functional block diagram of an image processing device of a fourth embodiment of the present invention.

FIG. 7 is a functional block diagram of an image processing device 2d of a fourth embodiment of the present invention.

The image processing device 2d illustrated in FIG. 7 is generally the same as the image processing device 2b of FIG. 4, but includes a background image generator 21d and an image corrector 22d instead of the background image generator 21b and image corrector 22b.

The background image generator 21d is generally the same as the background image generator 21b, but includes a threshold generator 217d instead of the threshold generator 217.

The threshold generator 217d obtains an average (or mean) value or a middle (or intermediate or median) value of pixel values of the average image De output from the average image generator 214, generates, in addition to the threshold Th for weight determination, a high-temperature threshold Tu and a low-temperature threshold Tl for image division, on the basis of the calculated average value or middle value, and transmits and stores the generated thresholds Th, Tu, and Tl to and in the storage device 3.

The high-temperature threshold Tu and low-temperature threshold Tl are used for image division.

The high-temperature threshold Tu is obtained by adding the difference threshold FDt to the average value or middle value of the pixel values of the average image De.

The low-temperature threshold Tl is obtained by subtracting the difference threshold FDt from the average value or middle value of the pixel values of the average image De.

When the high-temperature threshold Tu is generated as described above, the threshold Th for weight determination may be the same as the high-temperature threshold Tu.

The image corrector 22d divides a second thermal image Din2 into a high-temperature region, an intermediate-temperature region, and a low-temperature region by using the high-temperature threshold Tu and low-temperature threshold Tl read from the storage device 3, generates a color image Dh by coloring each region and combining them, and generates and outputs a corrected thermal image Dout by combining the color image Dh and the skeleton image Dg taken from the storage device 3.

The corrected thermal image Dout in this case is a color image colored according to the temperature of each part.

The image corrector 22d includes a weight determiner 222, a coloring unit 224, and a superimposer 221d.

The weight determiner 222 creates a weight table and determines a weight as described regarding the configuration of FIG. 4.

When creating the weight table illustrated in FIG. 5A or 5B, it is necessary to use the threshold Th. As described above, the threshold Th may be the same as the high-temperature threshold Tu. In this case, the high-temperature threshold Tu stored in the storage device 3 can be read and used as the threshold Th for creating the weight table.

When the weight table illustrated in FIG. 5A or 5B is created, it is possible to reduce a rate of the weighted addition of the skeleton image Dg only when the pixel value of the second thermal image Din2 is higher than the threshold Th. When the threshold Th is the same as the high-temperature threshold Tu, it is possible to reduce the addition rate of the skeleton image Dg only when the pixel value $P_{Din2}$ of the second thermal image Din2 belongs to the high-temperature region.

As described regarding the configuration of FIG. 4, the weight table may be as illustrated in FIG. 5C or 5D.

In short, the weight table should be such that the combination weight w decreases as the pixel value of the second thermal image Din2 increases.

Figure 8:
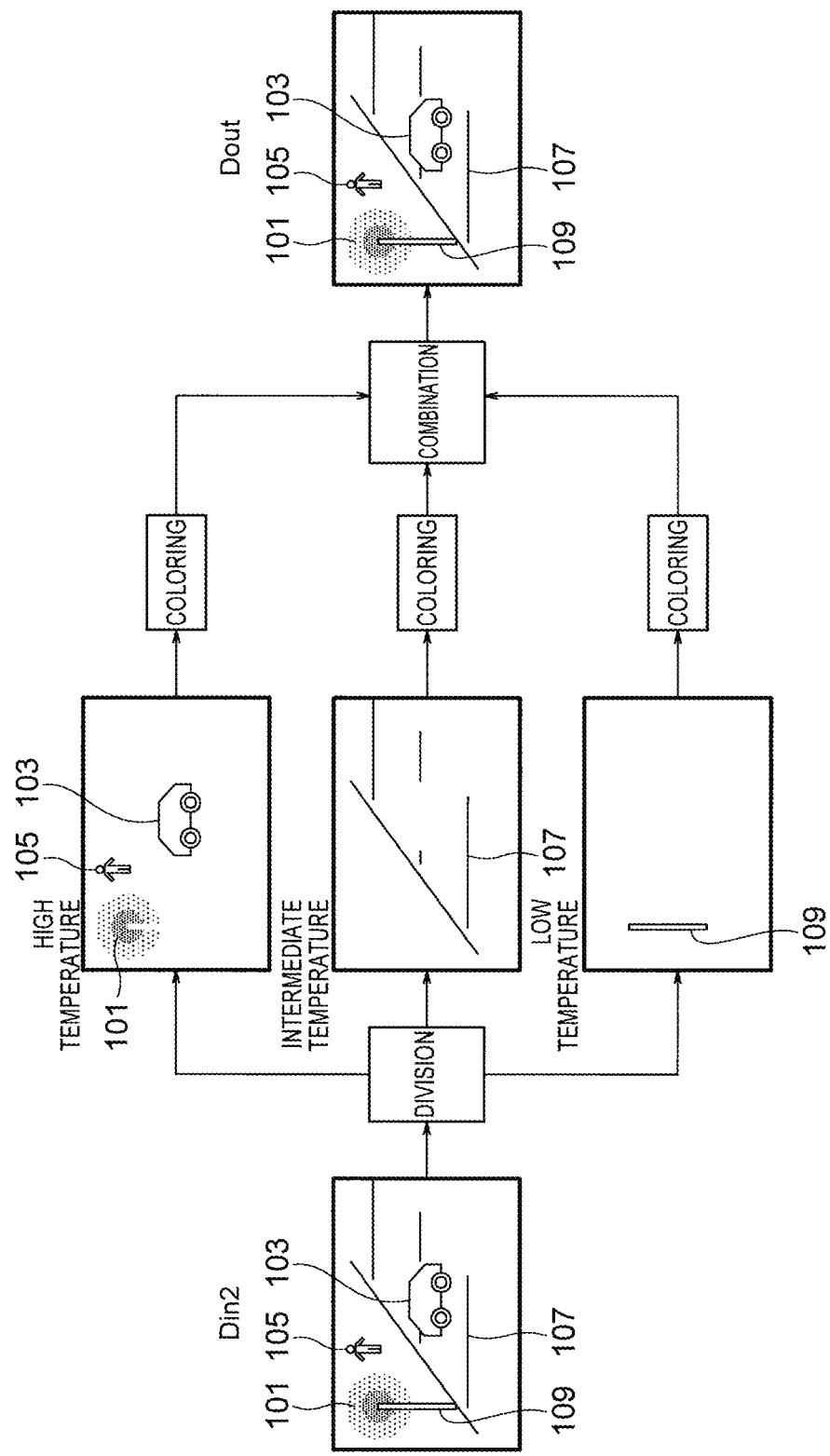
FIG. 8 is a diagram illustrating a process of dividing and coloring an image in a coloring unit of the image processing device of FIG. 7.
Figure 9:
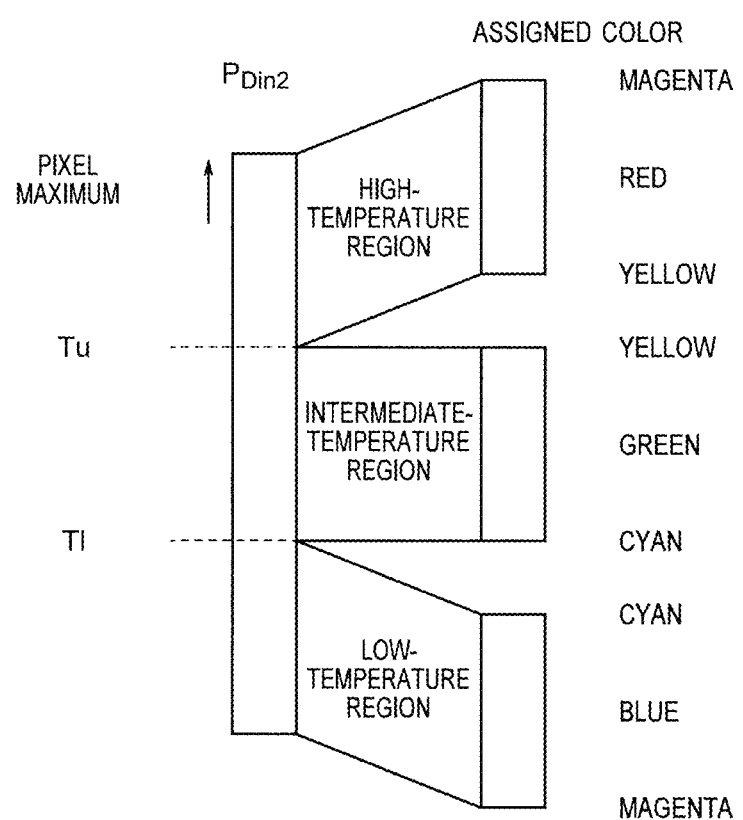
FIG. 9 is a diagram illustrating assignment of colors to divided images in the coloring unit of the image processing device of FIG. 7.

As illustrated in FIGS. 8 and 9, the coloring unit 224 divides the second thermal image Din2 into the high-temperature region, intermediate-temperature region, and low-temperature region by using the high-temperature threshold Tu and low-temperature threshold Tl, colors each region, and combines the colored images, thereby generating the color image Dh. The color image Dh is represented by, for example, red (R), green (G), and blue (B) signals.

Specifically, each pixel of the second thermal image Din2 is determined to belong to the high-temperature region when the pixel value is higher than the high-temperature threshold Tu, the intermediate-temperature region when the pixel value is not higher than the high-temperature threshold Tu and not lower than the low-temperature threshold Tl, and the low-temperature region when the pixel value is lower than the low-temperature threshold Tl.

In the example illustrated in FIG. 8, pixels constituting a light emitting portion 101 of a street light, an automobile 103, and a person 105 are determined to belong to the high-temperature region, pixels constituting a road marking 107 on a road are determined to belong to the intermediate-temperature region, and pixels constituting a support post 109 of the street light are determined to belong to the low-temperature region.

The coloring unit 224 assigns colors in different ranges, i.e., first, second, and third ranges to the high-temperature region, intermediate-temperature region, and low-temperature region, and in each region, assigns, to each pixel, a color corresponding to the pixel value of the colors in the range assigned to the region.

At this time, it is preferable to perform the assignment of colors to the high-temperature region, intermediate-temperature region, and low-temperature region and the assignment of colors corresponding to the pixel values so that the color continuously changes in boundary portions between the high-temperature region, intermediate-temperature region, and low-temperature region.

For example, as illustrated in FIG. 9, a hue range centered around red (e.g., from a center (center in the hue direction) of magenta to a center of yellow) is assigned to the high-temperature region, a hue range centered around green (from a center of yellow to a center of cyan) is assigned to the intermediate-temperature region, and a hue range centered around blue (from a center of cyan to a center of magenta) is assigned to the low-temperature region. In each region, a color in the assigned hue range is assigned to each pixel value.

The superimposer 221d weights and adds the color image Dh and the skeleton image Dg read from the storage device 3 by using the combination weights w.

The color image Dh is represented by R, G, and B signals, which are signals of three channels, whereas the skeleton image Dg is represented by a single-channel gray signal.

The skeleton image Dg is added to a luminance component Dhy of the color image Dh.

In an example of the process, values of R, G, and B components of the corrected thermal image are obtained by transforming the color image Dh into the luminance component Dhy and a chrominance component, e.g., color difference components Dhcb and Dhcr, adding the skeleton image Dg to the luminance component Dhy, and inversely transforming the luminance component Djy after the addition and the chrominance component, e.g., the color difference components Dhcb and Dhcr into R, G, and B.

The addition of the skeleton image Dg is represented by the following equation:

$$P_{Djy}=P_{Dhy}+P_{Dg}*g*w.$$ Equation (2)

In Equation (2), $P_{Dhy}$ is a value of the luminance component Dhy of the color image Dh, $P_{Dg}$ is a pixel value of the skeleton image Dg, g is the gain for the skeleton image Dg, w is the combination weight, and $P_{Djy}$ is a value of the luminance component Djy resulting from the addition.

In another example of the process, when the color image Dh is constituted by signals of three channels of R, G, and B, the skeleton image Dg is added to each channel.

The addition in this case is represented by the following Equations (3a) to (3c):

$$P_{Rout}=P_{Rin}+P_{Dg}*g*w,$$ Equation (3a)

$$P_{Gout}=P_{Gin}+P_{Dg}*g*w,$$ Equation (3b)

$$P_{Bout}=P_{Bin}+P_{Dg}*g*w.$$ Equation (3c)

In Equations (3a) to (3c), $P_{Rin}$ is a value of the R channel signal Rin of the color image Dh (a value of the red component), $P_{Gin}$ is a value of the G channel signal Gin of the color image Dh (a value of the green component), $P_{Bin}$ is a value of the B channel signal Bin of the color image Dh (a value of the blue component), $P_{Dg}$ is a pixel value of the skeleton image Dg, g is the gain for the skeleton image Dg, w is the combination weight, $P_{Rout}$ is a value of the R channel signal Rout (a value of the red component) resulting from the addition, $P_{Gout}$ is a value of the G channel signal Gout (a value of the green component) resulting from the addition, and $P_{Bout}$ is a value of the B channel signal Bout (a value of the blue component) resulting from the addition.

The above is a description of an operation of the image processing device according to the fourth embodiment.

The fourth embodiment provides the same advantages as the first embodiment.

In addition, in the fourth embodiment, the luminance component of the color image generated by coloring the second thermal image and the skeleton image Dg are combined. Thus, it is possible to visually separate information indicating heat sources and the skeleton image, and improve the visibility of heat sources. Specifically, when the second thermal image Din2 and skeleton image Dg are combined without coloring, information indicating heat sources included in the second thermal image Din2 may be buried in the skeleton image Dg. Such a situation can be avoided by coloring the second thermal image.

Also, using the weight table illustrated in FIG. 5A or 5B provides the advantage that in correcting the image, when the pixel value of the second thermal image Din2 is not higher than the threshold Th, the combination weight is made large, so that the second thermal image Din2 is sufficiently corrected with the skeleton image Dg, and when the pixel value of the second thermal image Din2 is higher than the threshold Th, the combination weight is made small, which prevents the skeleton image Dg from being added, at a great rate, to regions of the second thermal image Din2 in which heat sources are present, and improves the visibility.

Also, instead of fixing the assignment of colors to the pixel values regardless of the overall brightness (e.g., the average value of the pixel values) of the second thermal image Din2, by dividing the second thermal image Din2 into the high-temperature region, intermediate-temperature region, and low-temperature region, assigning different colors to the regions, and performing the coloring, it is possible to always represent the portion of the image having relatively high temperature with the high-temperature color (the color assigned to the high temperature) and the portion of the thermal image having relatively low temperature with the low-temperature color (the color assigned to the low temperature). For example, when the thermal image has a temperature offset, if the assignment of colors to the pixel values is fixed, a low-temperature region may be colored with a color representing an intermediate temperature. Such a situation is advantageously prevented.

Specifically, in the case of displaying a thermal image in color, for example, displaying high-temperature objects in red, low-temperature objects in blue, and intermediate-temperature objects in green is one of the typical coloring methods. However, when the thermal image has a temperature offset, the range from the low temperature to the intermediate temperature may be displayed in green, for example.

Such a situation can be prevented by dividing the thermal image into the high-temperature region, intermediate-temperature region, and low-temperature region, and then coloring each region.

In the fourth embodiment, as with the first embodiment, the sharpening and the extraction of the skeleton component are performed in the background image generator 21d, the skeleton image is stored in the storage device 3, and in the image corrector 22d, the skeleton image stored in the storage device 3 is read and used to correct the second thermal image.

Also in the fourth embodiment, as described in the third embodiment, it is possible that in the background image generator 21d, the sharpened image Df obtained by the sharpening is stored in the storage device 3, and in the image corrector 22d, the sharpened image Df stored in the storage device 3 is read, the skeleton image is generated by extracting the skeleton component, and the generated skeleton image is used to correct the second thermal image.

Also, in the fourth embodiment, it is possible to omit the weight determiner 222 and perform the weighted addition using a combination weight of a constant value.

Fifth Embodiment

Figure 10:
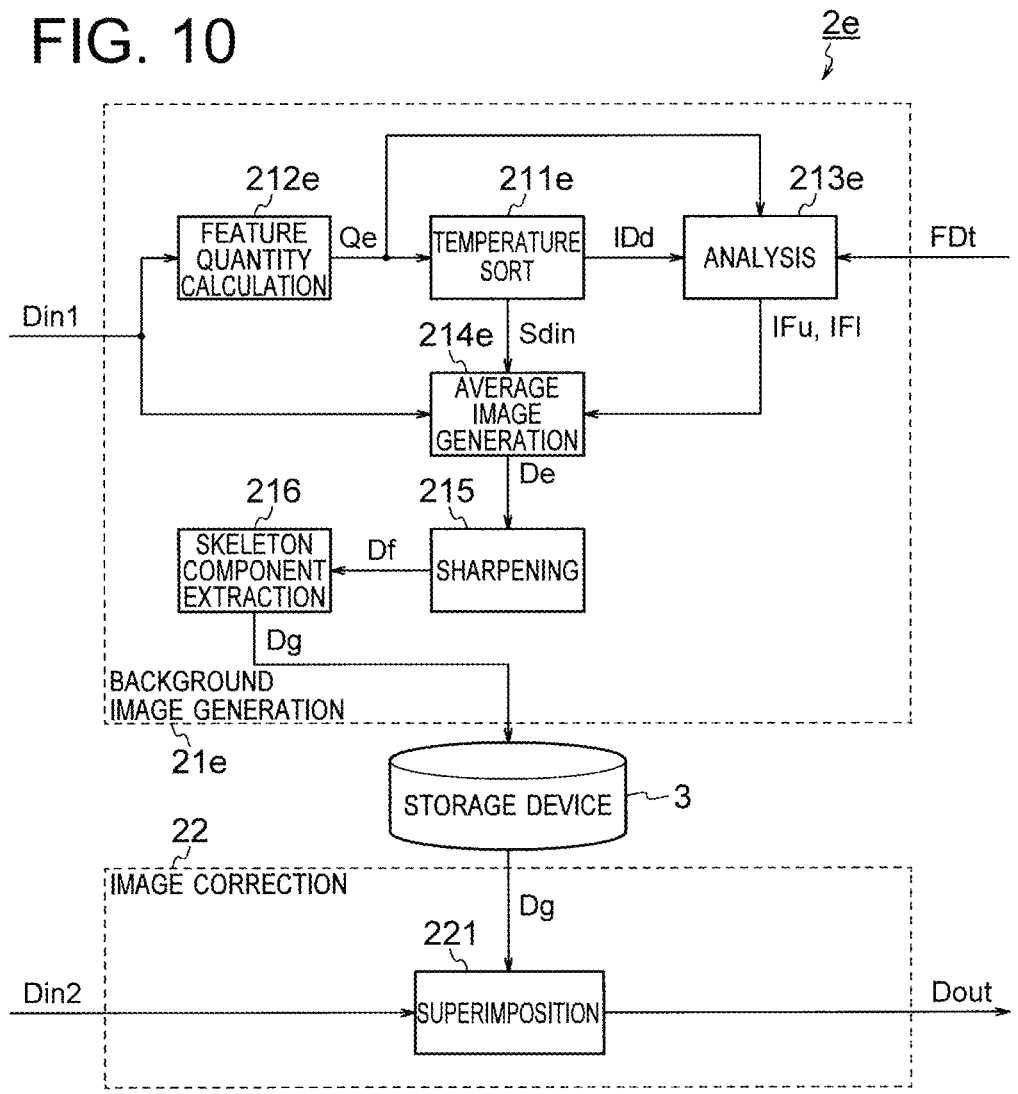
FIG. 10 is a functional block diagram of an image processing device of a fifth embodiment of the present invention.

FIG. 10 is a functional block diagram of an image processing device 2e of a fifth embodiment.

The image processing device 2e illustrated in FIG. 10 is generally the same as the image processing device 2 of FIG. 2, but includes a background image generator 21e instead of the background image generator 21.

The background image generator 21e is generally the same as the background image generator 21, but includes a temperature sorter 211e, a feature quantity calculator 212e, an analyzer 213e, and an average image generator 214e instead of the temperature sorter 211, feature quantity calculator 212, analyzer 213, and average image generator 214.

The feature quantity calculator 212e calculates a feature quantity Qe serving as an indicator of brightness, for each of the first thermal images Din1, which are multiple frames, i.e., for each first thermal image, which is each frame.

As the feature quantity Qe, an average (or mean) value, a middle (or intermediate or median) value, a highest value, or a lowest value of pixel values of each frame is calculated.

The temperature sorter 211e receives the feature quantities Qe calculated by the feature quantity calculator 212e, and ranks the first thermal images Din1, which are multiple frames, in order of magnitude of the feature quantities Qe. In ranking them, it is possible to rank them from the highest to the lowest (in descending order) or from the lowest to the highest (in ascending order) of the feature quantities.

The temperature sorter 211e further determines, as a middle image Dd, a first thermal image Din1 located at a middle, i.e., having a middle rank, when the first thermal images Din1 are ranked in order of magnitude of the feature quantities Qe.

The temperature sorter 211e outputs information Sdin indicating the respective ranks of the first thermal images Din1, which are multiple frames.

The temperature sorter 211e also outputs information IDd identifying the middle image Dd.

The analyzer 213e receives the feature quantities Qe of the respective first thermal images from the feature quantity calculator 212e, receives the information IDd identifying the middle image Dd from the temperature sorter 211e, and determines a high-temperature boundary frame Fu and a low-temperature boundary frame Fl.

The analyzer 213e determines, as the high-temperature boundary frame Fu, an image having the largest feature quantity of the first thermal images satisfying the condition that the feature quantity of the first thermal image is larger than that of the middle image Dd and the difference (absolute value) in the feature quantity between the first thermal image and the middle image Dd is smaller than the difference threshold FDt.

When there is no first thermal image satisfying the condition that the feature quantity of the first thermal image is larger than that of the middle image Dd and the difference (absolute value) in the feature quantity is not smaller than the difference threshold FDt, one of the first thermal images having the largest feature quantity is determined as the high-temperature boundary frame Fu.

The analyzer 213e further determines, as the low-temperature boundary frame Fl, an image having the smallest feature quantity of the first thermal images satisfying the condition that the feature quantity of the first thermal image is smaller than that of the middle image Dd and the difference (absolute value) in the feature quantity between the first thermal image and the middle image Dd is smaller than the difference threshold FDt.

When there is no first thermal image satisfying the condition that the feature quantity of the first thermal image is smaller than that of the middle image Dd and the difference (absolute value) in the feature quantity is not smaller than the difference threshold FDt, one of the first thermal images having the smallest feature quantity is determined as the low-temperature boundary frame Fl.

The analyzer 213e outputs information IFu identifying the high-temperature boundary frame Fu and information IFl identifying the low-temperature boundary frame Fl.

As described in the first embodiment, the difference threshold FDt may be stored in the storage device 3 or a parameter memory (not illustrated).

The average image generator 214e receives the input first thermal images Din1, receives the information Sdin indicating the ranks of the respective first thermal images, which are frames, from the temperature sorter 211e, receives the information IFu identifying the high-temperature boundary frame Fu and the information IFl identifying the low-temperature boundary frame Fl from the analyzer 213e, and generates an average image De.

The average image generator 214e generates the average image De by averaging, in the frame direction, the pixel values of the images, which are frames, from the high-temperature boundary frame Fu to the low-temperature boundary frame Fl (including the high-temperature boundary frame Fu and low-temperature boundary frame Fl) of the first thermal images Din1, which are multiple frames.

In generating the average image De, by excluding the frames having feature quantities larger than the feature quantity of the high-temperature boundary frame Fu and the frames having feature quantities smaller than the feature quantity of the low-temperature boundary frame Fl, it is possible to prevent the average image from being affected by objects, in particular heat sources (high-temperature objects) or low-temperature objects, that appear temporarily. The objects that appear temporarily mentioned here include persons.

The processes in the sharpening unit 215 and skeleton component extractor 216 are the same as those described in the first embodiment.

As described above, the background image generator 21e calculates the feature quantity Qe for each of the first thermal images Din1, which are multiple frames, generates the average image De by averaging, in the frame direction, the thermal images satisfying the condition that the difference in the feature quantity between the thermal image and the thermal image located at the middle when the thermal images, which are multiple frames, are ranked in order of magnitude of the feature quantities Qe is smaller than the predetermined threshold (difference threshold) FDt, generates the skeleton image Dg by sharpening the average image and then extracting the skeleton component, and stores the generated skeleton image Dg as the background image in the storage device 3.

The image corrector 22 is the same and operates in the same manner as the image corrector 22 of the first embodiment.

In the fifth embodiment, since temperature sort is performed according to the feature quantity of each frame, the process is relatively simple.

In addition to the above-described modifications, various modifications can be made to the image processing device of each embodiment described above.

Also, it is possible to combine features of each embodiment with features of other embodiments.

For example, although the second embodiment has been described as a modification to the first embodiment, the same modification can be applied to the third embodiment.

Also, although the fifth embodiment has been described as a modification to the first embodiment, the same modification can be applied to the second to fourth embodiments.

The image processing device 2, 2b, 2c, 2d, or 2e described in the first to fifth embodiments may be partially or wholly formed by processing circuitry.

For example, the functions of the respective portions of the image processing device may be implemented by respective separate processing circuits, or the functions of the portions may be implemented by a single processing circuit.

The processing circuitry may be implemented by dedicated hardware, or by software or a programmed computer.

It is possible that a part of the functions of the respective portions of the image processing device is implemented by dedicated hardware and another part is implemented by software.

Figure 11:
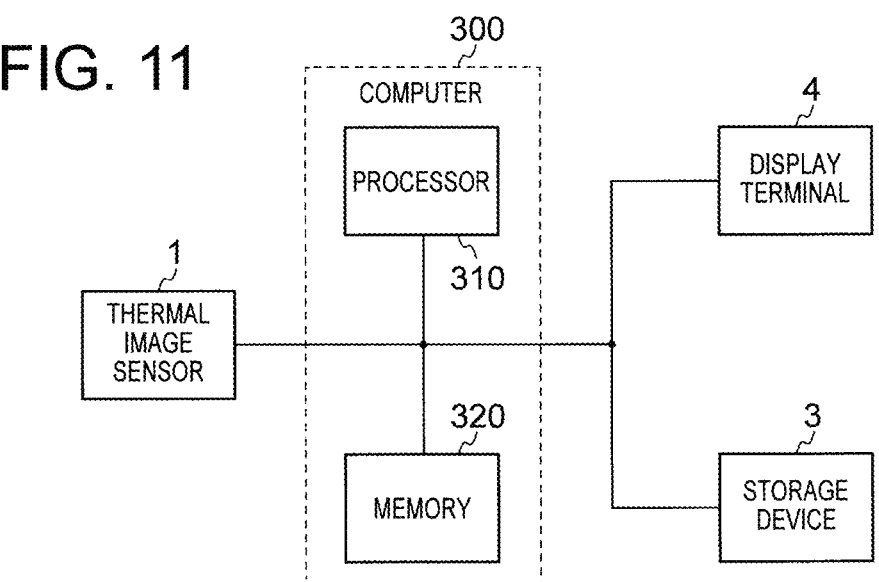
FIG. 11 is a block diagram illustrating a configuration example of a computer that executes processes of the image processing devices of the first to fifth embodiments.

FIG. 11 illustrates an example of a configuration in the case of implementing all the functions of the image processing device 2, 2b, 2c, 2d, or 2e of the above embodiments with a computer 300 including a single processor, together with the thermal image sensor 1, storage device 3, and display terminal 4.

In the illustrated example, the computer 300 includes a processor 310 and a memory 320.

A program for implementing the functions of the respective portions of the image processing device is stored in the memory 320 or storage device 3.

The processor 310 uses, for example, a central processing unit (CPU), a graphics processing unit (GPU), a microprocessor, a microcontroller, a digital signal processor (DSP), or the like.

The memory 320 uses, for example, a semiconductor memory, such as a random access memory (RAM), a read only memory (ROM), a flash memory, an erasable programmable read only memory (EPROM), or an electrically erasable programmable read only memory (EEPROM), a magnetic disk, an optical disk, a magnetic optical disk, or the like.

The processor 310 implements the function of the image processing device by executing the program stored in the memory 320 or storage device 3. When the program is stored in the storage device 3, it may be executed after being loaded into the memory 320 once.

The function of the image processing device includes control of display on the display terminal 4, writing of information to the storage device 3, and reading of information from the storage device 3, as described above.

The above processing circuitry may be attached to the thermal image sensor 1. Thus, the image processing device 2, 2b, 2c, 2d, or 2e may be implemented by processing circuitry attached to the thermal image sensor. Alternatively, the image processing device 2, 2b, 2c, 2d, or 2e may be implemented on a cloud server connectable to the thermal image sensor 1 via a communication network.

Also, the storage device 3 may be a storage area on a server on a cloud.

At least one of the image processing device and storage device may be implemented in a communication mobile terminal, such as a smartphone or a remote controller.

The thermal image generation system including the image processing device may be applied to a home appliance, and in this case, at least one of the image processing device and storage device may be implemented in a home energy management system (HEMS) controller.

The display terminal may also be implemented in a communication terminal, such as a smartphone or a home energy management system (HEMS) controller.

Image processing devices and thermal image generation systems including image processing devices of the present invention have been described above. The image processing methods implemented by the above image processing devices also form part of the present invention. Programs for causing computers to execute processes of the above image processing devices or image processing methods and computer-readable recording media storing the programs also form part of the present invention.

Although embodiments of the present invention have been described, the present invention is not limited to these embodiments.

REFERENCE SIGNS LIST 1 thermal image sensor, 2, 2b, 2c, 2d, 2e image processing device, 3 storage device, 4 display terminal, 21, 21b, 21c, 21d, 21e background image generator, 22, 22b, 22c, 22d image corrector, 211, 211e temperature sorter, 212, 212e feature calculator, 213, 213e analyzer, 214, 214e average image generator, 215 sharpening unit, 216 skeleton component extractor, 217, 217d threshold generator, 221, 221d superimposer, 222 weight determiner, 223 skeleton component extractor, 224 coloring unit.

The invention claimed is:

1. An image processing device comprising:
a background image generator; and
an image corrector,
wherein the background image generator
determines a middle image located at a middle when first thermal images of multiple frames obtained by imaging by a thermal image sensor in a same field of view or sorted images of multiple frames generated from the first thermal images are ranked in order of brightness,
calculates a feature quantity serving as an indicator of brightness for each of the first thermal images or the sorted images,
generates an average image by averaging, in a frame direction, first thermal images or sorted images of multiple frames of the first thermal images or the sorted images satisfying a condition that a difference in the feature quantity between the first thermal image or the sorted image and the middle image is smaller than a predetermined difference threshold, and
stores, in a storage device, a skeleton image obtained by sharpening the average image and then extracting a skeleton component, and
wherein the image corrector generates a corrected thermal image by correcting a second thermal image obtained by imaging by the thermal image sensor in a same field of view as the first thermal images, by using the skeleton image stored in the storage device.

2. The image processing device of claim 1, wherein the background image generator ranks pixels at same positions of the first thermal images of multiple frames in order of magnitude of pixel values, generates, as the sorted images, images of multiple frames each formed by a set of pixels having a same rank, determines, as the middle image, one of the sorted images formed by a set of pixels having a middle rank, and calculates the feature quantity for each of the sorted images of multiple frames.

3. The image processing device of claim 1, wherein the background image generator calculates the feature quantity for each of the first thermal images of multiple frames, and determines, as the middle image, a first thermal image located at a middle when the first thermal images of multiple frames are ranked in order of magnitude of the feature quantities.

4. The image processing device of claim 1, wherein the image corrector generates the corrected thermal image by weighting and adding the second thermal image and the skeleton image.

5. The image processing device of claim 4, wherein in correcting the second thermal image by using the skeleton image, when a pixel value of the second thermal image is not lower than a threshold for weight determination, the image corrector performs the weighted addition with the skeleton image weighted by a weight that decreases as the pixel value of the second thermal image increases.

6. The image processing device of claim 1, wherein the image corrector generates a color image by coloring the second thermal image, and generates the corrected thermal image by correcting the color image by using the skeleton image.

7. The image processing device of claim 6, wherein the image corrector transforms the color image into a luminance component image and a chrominance component image, generates a corrected luminance component image by weighting and adding the luminance component image and the skeleton image, and generates the corrected thermal image by transforming the corrected luminance component image and the chrominance component image into a color image.

8. The image processing device of claim 6, wherein the image corrector divides the second thermal image into a high-temperature region, an intermediate-temperature region, and a low-temperature region by using a high-temperature threshold and a low-temperature threshold for image division, and generates the color image by coloring each region and combining the regions.

9. The image processing device of claim 8, wherein the image corrector assigns colors in different ranges to the high-temperature region, the intermediate-temperature region, and the low-temperature region, in each region, assigns, to each pixel, a color corresponding to a pixel value of the colors in the range assigned to the region, and in boundary portions between the high-temperature region, the intermediate-temperature region, and the low-temperature region, performs the assignment to the high-temperature region, the intermediate-temperature region, and the low-temperature region and the assignment according to the pixel values so that the color changes continuously.

10. The image processing device of claim 8 or 9, wherein the background image generator uses, as the high-temperature threshold, a value obtained by adding the difference threshold to an average value or a middle value of pixel values of the average image, and uses, as the low-temperature threshold, a value obtained by subtracting the difference threshold from the average value or the middle value of the pixel values of the average image.

11. The image processing device of claim 1, wherein the image processing device is implemented in processing circuitry attached to the thermal image sensor.

12. The image processing device of claim 1, wherein the image processing device is implemented on a cloud server connectable to the thermal image sensor via a communication network.

13. A thermal image generation system comprising:
the image processing device of claim 1;
the thermal image sensor; and
the storage device.

14. A non-transitory computer-readable recording medium storing a program for causing a computer to execute a process of the image processing device of claim 1.

15. An image processing device comprising:
a background image generator; and
an image corrector,
wherein the background image generator
determines a middle image located at a middle when first thermal images of multiple frames obtained by imaging by a thermal image sensor in a same field of view or sorted images of multiple frames generated from the first thermal images are ranked in order of brightness, calculates a feature quantity serving as an indicator of brightness for each of the first thermal images or the sorted images, generates an average image by averaging, in a frame direction, first thermal images or sorted images of multiple frames of the first thermal images or the sorted images satisfying a condition that a difference in the feature quantity between the first thermal image or the sorted image and the middle image is smaller than a predetermined difference threshold, and stores, in a storage device, a sharpened image obtained by sharpening the average image, and wherein the image corrector generates a corrected thermal image by correcting a second thermal image obtained by imaging by the thermal image sensor in a same field of view as the first thermal images, by using a skeleton image obtained by extracting a skeleton component from the sharpened image stored in the storage device.

16. The image processing device of claim 15, wherein the background image generator ranks pixels at same positions of the first thermal images of multiple frames in order of magnitude of pixel values, generates, as the sorted images, images of multiple frames each formed by a set of pixels having a same rank, determines, as the middle image, one of the sorted images formed by a set of pixels having a middle rank, and calculates the feature quantity for each of the sorted images of multiple frames.

17. The image processing device of claim 15, wherein the background image generator calculates the feature quantity for each of the first thermal images of multiple frames, and determines, as the middle image, a first thermal image located at a middle when the first thermal images of multiple frames are ranked in order of magnitude of the feature quantities.

18. A thermal image generation system comprising:
the image processing device of claim 15;
the thermal image sensor; and
the storage device.

19. A non-transitory computer-readable recording medium storing a program for causing a computer to execute a process of the image processing device of claim 15.

* * * * *